(12) United States Patent
Yerli (10) Patent No.: US 11,115,468 B2
(45) Date of Patent: Sep. 7, 2021

(54) LIVE MANAGEMENT OF REAL WORLD VIA A PERSISTENT VIRTUAL WORLD SYSTEM

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 0 days.

(21) Appl. No.: 16/882,080

(22) Filed: May 22, 2020

(65) Prior Publication Data
US 2020/0374345 A1   Nov. 26, 2020

Related U.S. Application Data

(60) Provisional application No. 62/852,197, filed on May 23, 2019.

(51) Int. Cl.
*G06F 15/16* (2006.01)
*H04L 29/08* (2006.01)
(Continued)

(52) U.S. Cl.
CPC ........ *H04L 67/1095* (2013.01); *G06F 16/275* (2019.01); *G06N 20/00* (2019.01); *H04L 67/12* (2013.01); *H04L 67/38* (2013.01)

(58) Field of Classification Search
CPC ...... H04L 67/1095; H04L 67/12; H04L 67/38
(Continued)

(56) References Cited

U.S. PATENT DOCUMENTS

| 5,883,817 A | 3/1999 | Chisholm et al. |
| 5,956,039 A | 9/1999 | Woods et al. |

(Continued)

FOREIGN PATENT DOCUMENTS

| CN | 100484726 C | 5/2009 |
| CN | 102120325 B | 12/2012 |

(Continued)

OTHER PUBLICATIONS

"Walmart Patent Wants You to Shop at Home Using Virtual Reality," Research Brief, Aug. 17, 2018, <https://www.cbinsights.com/research/walmart-virtual-reality-retail-patent/> [retrieved Jun. 5, 2020], 8 pages.

(Continued)

*Primary Examiner* — Moustafa M Meky
(74) *Attorney, Agent, or Firm* — Christensen O'Connor Johnson Kindness PLLC (57) ABSTRACT

A method enabling live management of events in the real world through a persistent virtual world system comprises providing in the memory of a server a database with structured data storing a persistent virtual world system comprising virtual replicas of real-world elements; synchronizing the virtual replicas with the respective real-world elements by using a plurality of connected elements connected to the server via a network, the connected elements comprising sensing mechanisms configured to capture data from the real-world elements; and managing events in the real world through the synchronized persistent virtual world system. Management of events comprises monitoring activity in the real world through a persistent virtual world system; detecting the events; checking whether events fall within one or more predetermined analysis requirement parameters; defining timeframe of events; storing the events in the memory; recreating the events; and analyzing the events.

20 Claims, 7 Drawing Sheets

(51) Int. Cl.
    *G06N 20/00* (2019.01)
    *G06F 16/27* (2019.01)
    *H04L 29/06* (2006.01)

(58) Field of Classification Search
    USPC .................................................. 709/224
    See application file for complete search history.

(56) References Cited

U.S. PATENT DOCUMENTS

| | | |
|---|---|---|
| 6,278,479 B1 | 8/2001 | Wilson et al. |
| 6,556,206 B1 | 4/2003 | Benson et al. |
| 7,168,051 B2 | 1/2007 | Robinson et al. |
| 7,529,690 B2 | 5/2009 | Hadi |
| 8,326,704 B2 | 12/2012 | Glazer et al. |
| 8,564,621 B2 | 10/2013 | Branson et al. |
| 9,281,727 B1 | 3/2016 | Coley et al. |
| 9,511,291 B2 | 12/2016 | Lyons et al. |
| 9,669,321 B2* | 6/2017 | Reveley ............... G06F 1/1694 |
| 9,704,298 B2 | 7/2017 | Espeset et al. |
| 9,721,386 B1 | 8/2017 | Worley, III et al. |
| 10,565,764 B2 | 2/2020 | Han et al. |
| 2002/0116235 A1 | 8/2002 | Grimm et al. |
| 2002/0191017 A1 | 12/2002 | Sinclair et al. |
| 2003/0030658 A1 | 2/2003 | Gibbs et al. |
| 2006/0122917 A1 | 6/2006 | Lokuge et al. |
| 2006/0184886 A1 | 8/2006 | Chung et al. |
| 2007/0168463 A1 | 7/2007 | Rothschild |
| 2008/0263460 A1 | 10/2008 | Altberg et al. |
| 2009/0055019 A1 | 2/2009 | Stiehl et al. |
| 2009/0244059 A1 | 10/2009 | Kulkarni et al. |
| 2009/0326713 A1 | 12/2009 | Moriya |
| 2010/0131865 A1* | 5/2010 | Ackley ................. G06F 3/016 715/757 |
| 2010/0131947 A1* | 5/2010 | Ackley ................. A63F 13/12 718/1 |
| 2011/0060425 A1 | 3/2011 | Freed |
| 2012/0038667 A1* | 2/2012 | Branson ................. G09G 5/12 345/632 |
| 2012/0105475 A1 | 5/2012 | Tseng |
| 2012/0133638 A1 | 5/2012 | Davison et al. |
| 2012/0149349 A1 | 6/2012 | Quade |
| 2013/0009994 A1 | 1/2013 | Hill |
| 2013/0044106 A1 | 2/2013 | Shuster et al. |
| 2013/0179576 A1 | 4/2013 | Boldyrev et al. |
| 2013/0117377 A1 | 5/2013 | Miller |
| 2014/0063061 A1 | 3/2014 | Reitan |
| 2014/0214504 A1 | 7/2014 | Young et al. |
| 2014/0221090 A1 | 8/2014 | Mutschler et al. |
| 2014/0282220 A1 | 9/2014 | Wantland et al. |
| 2015/0188984 A1 | 7/2015 | Mullins |
| 2016/0300392 A1 | 10/2016 | Jonczyk et al. |
| 2016/0343168 A1 | 11/2016 | Mullins et al. |
| 2016/0379415 A1 | 12/2016 | Espeset et al. |
| 2017/0092223 A1* | 3/2017 | Fain ........................ G09B 9/301 |
| 2017/0203438 A1 | 7/2017 | Guerin et al. |
| 2017/0243403 A1* | 8/2017 | Daniels ................. G06T 19/20 |
| 2017/0250930 A1 | 8/2017 | Ben-Itzhak |
| 2017/0286572 A1 | 10/2017 | Hershey et al. |
| 2017/0287496 A1 | 10/2017 | Heitkamp et al. |
| 2017/0289202 A1 | 10/2017 | Krasadakis |
| 2017/0358024 A1 | 12/2017 | Mattingly et al. |
| 2018/0040038 A1 | 2/2018 | Vanslette et al. |
| 2018/0047093 A1 | 2/2018 | High et al. |
| 2018/0060948 A1 | 3/2018 | Mattingly et al. |
| 2018/0089903 A1 | 3/2018 | Pang |
| 2018/0173309 A1 | 6/2018 | Uchiyama et al. |
| 2018/0210436 A1 | 7/2018 | Burd et al. |
| 2018/0231973 A1 | 8/2018 | Mattingly et al. |
| 2018/0281193 A1 | 10/2018 | Favis |
| 2018/0342106 A1 | 11/2018 | Rosado |
| 2018/0349108 A1 | 12/2018 | Brebner |
| 2019/0065028 A1 | 2/2019 | Chashchin-Semenov et al. |
| 2019/0102494 A1 | 4/2019 | Mars |
| 2019/0102709 A1 | 4/2019 | Correa |
| 2019/0221036 A1 | 7/2019 | Griffin et al. |
| 2019/0361589 A1 | 11/2019 | Yerli |
| 2019/0361797 A1 | 11/2019 | Yerli |
| 2020/0175759 A1 | 6/2020 | Russell et al. |
| 2020/0209949 A1* | 7/2020 | Noris ..................... G06Q 50/01 |
| 2020/0210137 A1* | 7/2020 | Noris ................... G06F 3/04842 |
| 2020/0211251 A1* | 7/2020 | Noris ..................... G06T 15/005 |
| 2020/0349735 A1 | 11/2020 | Dine et al. |

FOREIGN PATENT DOCUMENTS

| | | |
|---|---|---|
| DE | 101 28 015 A1 | 12/2001 |
| DE | 10 2005 011 126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 1020180020725 A | 4/2019 |
| WO | 02/063454 A1 | 8/2002 |
| WO | 2008/065458 A2 | 6/2008 |
| WO | 2008/065458 A3 | 6/2008 |
| WO | 2009/029559 A1 | 3/2009 |
| WO | 2013/050473 A1 | 4/2013 |
| WO | 2016/017254 A1 | 2/2016 |
| WO | 2016/077493 A1 | 5/2016 |
| WO | 2016/164178 A1 | 10/2016 |
| WO | 2017/141391 A1 | 8/2017 |
| WO | 2018/074000 A1 | 4/2018 |
| WO | 2019/079826 A1 | 4/2019 |

OTHER PUBLICATIONS

European Search Report dated Jan. 17, 2020, in European Application No. 19176436.4, filed May 24, 2019, 33 pages.
Massachusetts Institute of Technology, "Huggable", Jul. 17, 2013, <http://www.youtube.com/watch?v=Z-8_RhkdvoA> [retrieved Sep. 6, 2019], 2 pages.
Partial European Search Report dated Sep. 9, 2019, in European Application No. 19176436.4, filed May 24, 2019, 18 pages.
Alsamhi, S.H., et al, "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1-10.
Office Action dated Aug. 26, 2020, issued in U.S. Appl. No. 16/903,235, filed Jun. 16, 2020, 21 pages.
Office Action dated Aug. 24, 2020, issued in U.S. Appl. No. 16/903,239, filed Jun. 16, 2020, 19 pages.
Extended European Search Report dated Sep. 14, 2020, issued in European Application No. 20176245.7, 8 pages.
European Search Report dated Nov. 18, 2020, issued in European Application No. 20180856.5, 12 pages.
European Search Report dated Nov. 17, 2020, issued in European Application No. 20180736.9, 13 pages.
European Search Report dated Oct. 27, 2020, issued in European Application No. 20180712.0, 11 pages.
Extended European Search Report dated Nov. 16, 2020, issued in European Application No. 20180885.4, 12 pages.
Extended European Search Report dated Nov. 18, 2020, issued in European Application No. 20180739.3, 12 pages.
Extended European Search Report dated Nov. 18, 2020, issued in European Application No. 20180723.7, 12 pages.
Office Action dated Jan. 11, 2021, issued in U.S. Appl. No. 16/903,239, filed Jun. 16, 2020, 28 pages.
Office Action dated Jan. 11, 2021, issued in U.S. Appl. No. 16/903,235, filed Jun. 16, 2020, 26 pages.
Tang, X., et al., "Virtual Reality Tools for Internet-Based Robotic Teleoperation", Proceedings of the Eighth IEEE International Symposium on Distributed and Real-Time Applications, 2004, 5 pages.
Asanuma, K., et al., "User Interface for Remote Operation of a Moving Robot via Internet", 9 pages.
Office Action dated Feb. 17, 2021, issued in U.S. Appl. No. 16/904,213, filed Jun. 16, 2020, 18 pages.
Extended European Search Report dated Oct. 17, 2019, issued in European Application No. 19176426.5, filed May 24, 2019, 9 pages.

(56) References Cited

OTHER PUBLICATIONS

Korean Office Action dated May 26, 2020, issued in KR Application No. 10-2019-0060412, filed May 23, 2019, 13 pages.

Rajappa et al., "Application and Scope Analysis of Augmented Reality in Marketing using Image Processing Technique" (2016).

Office Action dated Aug. 6, 2020, in U.S. Appl. No. 16/421,155, filed May 23, 2019, 26 pages.

Office Action dated Feb. 12, 2021, in U.S. Appl. No. 16/421,155, filed May 23, 2019, 26 pages.

Office Action dated Nov. 19, 2020, issued in Japanese Application No. 2019096980, 42 pages.

Web+DB Press, vol. 32, May 25, 2006, ISBN 4-7741-2752-3, p. 10-17.

Yoshiyuki Hashimoto, "iOS iBeacon/GeoFence/Navi/CoreMotion/M7" (Japanese version) Mar. 1, 2014, ISBN 978-4-7980-4070-7, pp. 82-94.

Micheal Lanham, "Unity AR" (Japanese version), Sep. 1, 2017, ISBN 978-4-87311-810-9, 26 pages.

Jeffrey Richter, "Windows Runtime" (Japanese version), Jun. 9, 2014, ISBN 978-4-8222-9831-9, pp. 291-300.

Office Action dated Apr. 26, 2021, issued in U.S. Appl. No. 16/903,227, filed Jun. 16, 2020, 40 pages.

Kias et al., "VR is on the Edge: How to Deliver 360 Videos in Mobile Networks", ACM, 2017.

Foley et al., "KD-Tree Acceleration Structures for a GPU Raytracer", ACM, 2005.

Diverdi et al., "Level of Detail Interfaces", IEEE, 2004.

Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.Voutube.com/watch?v=CVmfP8 TaqNU [retrieved on Oct. 30, 2020].

Office Action dated Nov. 17, 2020, in Japanese Application No. 2019096678, filed May 23, 2019, 3 pages.

\* cited by examiner

LIVE MANAGEMENT OF REAL WORLD VIA A PERSISTENT VIRTUAL WORLD SYSTEM

CROSS-REFERENCE TO RELATED APPLICATION

This application claims the benefit of Provisional Application No. 62/852,197, filed May 23, 2019, the entire disclosure of which is hereby incorporated by reference herein for all purposes.

FIELD

The present disclosure generally relates to computer systems, and more specifically to a system and method that enable live management of events in the real world via a persistent virtual world system.

BACKGROUND

A virtual world is a simulated environment providing a graphical and physical representation of either a real or imaginary world, where users can interact with each other or with other elements via avatars. Virtual worlds are used, for example, in the creation of video games, animated films or to train pilots in a flight simulation. In all these applications, programs are used to render features that interact, move, and change based on user-inputs or programmed/learned behaviors.

Objects in the virtual world may follow rules related to gravity, topography, locomotion, physics and kinematics, which may or may not be based on real-world elements. As such, current techniques exist for creating a virtual replica of a real-world item. However, these virtual replicas often do not contain all the data of the real-world element and the context around them. Moreover, the replicas are typically not synchronized with their real-world counterpart to reflect changes made in the real-world. This limits the ability to employ the virtual world for significant applications such as management of buildings, factories, and cities, as well as for identifying anomalies in those environments. For example, in order to track accidents that may take place on the road, factories, homes, etc., it is usually necessary to go through hours of footage in order to identify the right moment where the accident took place.

Therefore, improvements in the way that virtual replicas of real-world elements are generated and synchronized are desired.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more drawbacks described in the background are addressed through systems and methods of the current disclosure, which enable the management of events occurring in the real world via a persistent virtual world system stored in the memory of a server. In the current disclosure, the term "events" refers to activities taking place in the real world which may be simulated in real-time via the persistent virtual world system. Events may be determined by computer logic under a plurality of criteria that can be defined within value thresholds. Events can be classified into ordinary events and extraordinary events. Ordinary events relate to activities that fall within predetermined standard parameter values, while extraordinary events refer to events that fall out of the predetermined parameter values.

A system of the current disclosure comprises a server system comprising one or more server computers, each server computer including memory and at least one processor, the server system including a database with structured data storing a persistent virtual world system comprising virtual replicas of real-world elements; and a plurality of connected elements connected to the server via a network, each connected element comprising communication circuitry and one or more sensing mechanisms configured to capture data from one or more of the real-world elements, thereby enabling a real-world and persistent virtual world system synchronization. The server system is configured to synchronize the persistent virtual world system with the real-world elements using the dynamic data captured by the connected elements and static data, and to enable live management of events in the real world through the synchronized persistent virtual world system.

According to an embodiment, the connected elements are one or more mobile phones, laptops, wearable computers, mobile game consoles, head-mounted displays, see-through devices, smart contact lenses, surveillance cameras, vehicles, traffic lights, buildings, streets, train-tracks, home appliances, or any other device that may be connected to a network. According to an embodiment, the plurality of sensing mechanisms mounted on the connected elements include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof.

In some embodiments, management of events in the real world comprises one or more of the steps of monitoring activity in the real world through the persistent virtual world system; detecting the events, wherein the events are defined within pre-determined parameter values that are compared with the real values of activities in the real world; and checking whether events fall within one or more predetermined analysis requirement parameters; wherein the checking step comprises, in a negative case where an event falls outside the one or more predetermined analysis requirement parameters, continuing to monitor activity in the real world, and in a positive case where the event falls within the one or more predetermined analysis requirement parameters, the process continues by defining the timeframe of events; storing the events in the memory; recreating the events; and analyzing the events.

In various embodiments, monitoring of events may be performed through the plurality of sensing mechanisms on the plurality of connected elements connected to the server via the network, and may comprise a passive observation of activity taking place in the real world.

Detecting events may be performed by comparing the real values of activities taking place in the real world with predetermined standard value ranges linked to the event. In yet other embodiments, detecting events further comprises classifying the events into ordinary or extraordinary events.

Recreating the events may be performed by generating event data points comprising data gathered within the duration of events, generating simulation data corresponding to duration of the events, or combinations thereof. In some embodiments, recreating of events further comprises replaying events and experiences related to the events in digital realities (e.g., augmented reality, or virtual reality, or combinations thereof).

Analyzing the events may be performed by applying statistical and/or logical algorithms to describe, condense and evaluate the events. Analysis of events may be performed automatically by artificial intelligence algorithms or may involve human interaction.

According to an embodiment, recreating events in digital realities may provide event analyzers with context-rich 3D images and experiences of the events, which may be helpful during event analysis. In some embodiments, the events may be reviewed and analyzed from different perspectives. In other embodiments, recreating events may also provide other types of experiences created during generation of event data points, including simulations with audio data, haptic data, motion data, connected element or system data (like vehicular telemetry, drone telemetry) textual data (e.g., subtitles, comments, annotations, etc.), etc.

According to an embodiment, management of events further comprises operation of the events through artificial intelligence algorithms or user input. Operation of events may be performed as a result of the analysis of the events. Operation of events may trigger one or more actions on one or more real-world elements through their respective virtual replicas in the persistent virtual world system. In some embodiments, operations of events may be influenced by whether the events are ordinary or extraordinary events.

According to an embodiment, management of events comprises sharing stored events with one or more users, e.g., through the server system or one or more other servers through the network. Sharing of events may be performed in order to perform further analysis of the events, further operations, or combinations thereof.

According to an embodiment, occurrence of events has an effect on the context around the events, triggering other events in the real world through the persistent virtual world system that comprise interactions between one or more real-world elements within the affected context. Such effects on the context of events may trigger further operations of real-world elements, which can provide further data for analysis of the events.

In some embodiments, the persistent virtual world system comprises a virtual 3D infrastructure including one or more virtual replicas, purely virtual objects, virtual corridors, and digital reality applications, or combinations thereof enabling spatial organization, behaviors, computational and logical interactions between each other and with elements of the real world through their corresponding virtual replicas. The virtual corridors of the virtual 3D infrastructure can serve to define and delimit the path of real objects through their virtual replicas, purely virtual objects, or digital reality applications.

According to an embodiment, the data used for synchronizing virtual replicas with the respective real-world elements comprises capturable data of real-world elements. The data comprises, for example, one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others. In some embodiments, the static data includes data that is not likely to change, such as the location, position and orientation of static objects, such as buildings and internal elements, monuments, parks, natural structures, etc. In other embodiments, the dynamic data includes data that is periodically updated, meaning that it may change asynchronously over time as new information becomes available. For example, dynamic data may include the position and orientation of moving objects, such as vehicles, or other data that may change over time, such as temperature, pressure, humidity, etc.

In some embodiments, the data used for synchronizing virtual replicas further includes contextual data, which can be classified into micro-context immediately affecting a real-world element, and macro-context derived from a plurality of micro-contexts. In further embodiments, the micro-context further includes 3D image data, 3D geometries, 3D entities, 3D dynamic objects, video data, audio data, textual data, time data, metadata, priority data, security data, positional data, lighting data, temperature data, quality of service (QOS), and service context of the environment immediately surrounding and affecting a target real-world element. In further embodiments, the macro-context further comprises holistic information of a system including current efficiency of a manufacturing plant, air quality, climate change levels, company efficiency, city efficiency, country efficiency, and worldwide efficiency.

In some embodiments, the persistent virtual world system is structured by layers, where outer layers comprise inner layers. The outer layers may represent higher-level entities, and the inner layers may represent lower-level, more in-depth entities. For example, an outer layer may represent a country, which may be composed of several cities, each city representing an inner layer of the country. Each city, on the other hand, may include several districts, each district representing an inner layer of the city. The districts may include several neighborhoods, each neighborhood representing an inner layer of the district. Each neighborhood may include several houses, stores, and factories, for example, each of these elements representing an inner layer of the neighborhood. Finally, each of these inner layer elements of the neighborhood may also include connected elements with sensing mechanisms configured to obtain real-time data that enriches and updates the virtual replicas.

In some embodiments, event management may be implemented by layers. For example, a human or artificial intelligence administrator at a district level may be responsible for monitoring a district, and may be in charge of analyzing occurrences therein in order to generate one or more operation instructions derived from the event analysis. In other examples, a human or artificial intelligence administrator at a city level may be responsible for monitoring a city, and may be in charge of analyzing occurrences therein to generate one or more operation instructions derived from the event analysis.

According to an embodiment, a method enabling live management of events in the real world through a persistent virtual world system comprises the steps of providing in the memory of a server system a database with structured data storing a persistent virtual world system comprising virtual replicas of real-world elements; synchronizing the virtual replicas with the respective real-world elements using dynamic data and static data from a plurality of connected elements connected to the server via a network, the connected elements comprising sensing mechanisms configured to capture the dynamic data from the real-world elements; and managing events in the real world through the synchronized persistent virtual world system.

According to an embodiment, a method for live management of events comprises one or more of the steps of monitoring activity in the real world through persistent virtual world system; detecting the events, wherein the events are defined within pre-determined parameter values that are compared with the real values of activities in the real world; and checking whether events fall within one or more predetermined analysis requirement parameters; wherein the checking step comprises, in a negative case where an event falls outside the one or more predetermined analysis requirement parameters, continuing to monitor activity in the real world, and in a positive case where the event falls within the one or more predetermined analysis requirement parameters, the process continues by: defining timeframe of events; storing the events in the memory; recreating the events; and analyzing the events.

According to an embodiment, a non-transitory computer readable medium storing a program configured to cause one or more processors to perform steps comprising providing a database with structured data storing a persistent virtual world system comprising virtual replicas of real-world elements; synchronizing the virtual replicas with the respective real-world elements using dynamic and static data obtained from a plurality of connected elements connected to a server via a network, the connected elements comprising sensing mechanisms configured to capture the dynamic data from the real-world elements; and managing events in the real world through the synchronized persistent virtual world system.

According to an embodiment, instructions recorded in the non-transitory computer-readable medium enabling management of events cause a processor to execute a process comprising monitoring activity in the real world through the persistent virtual world system; detecting the events, wherein the events are defined within pre-determined parameter values that are compared with the real values of activities in the real world; and checking whether events fall within one or more predetermined analysis requirement parameters; wherein the checking step comprises, in a negative case where an event falls outside the one or more predetermined analysis requirement parameters, continuing to monitor activity in the real world, and in a positive case where the event falls within the one or more predetermined analysis requirement parameters, the process continues by: defining timeframe of events; storing the events in the memory; recreating the events; and analyzing the events.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
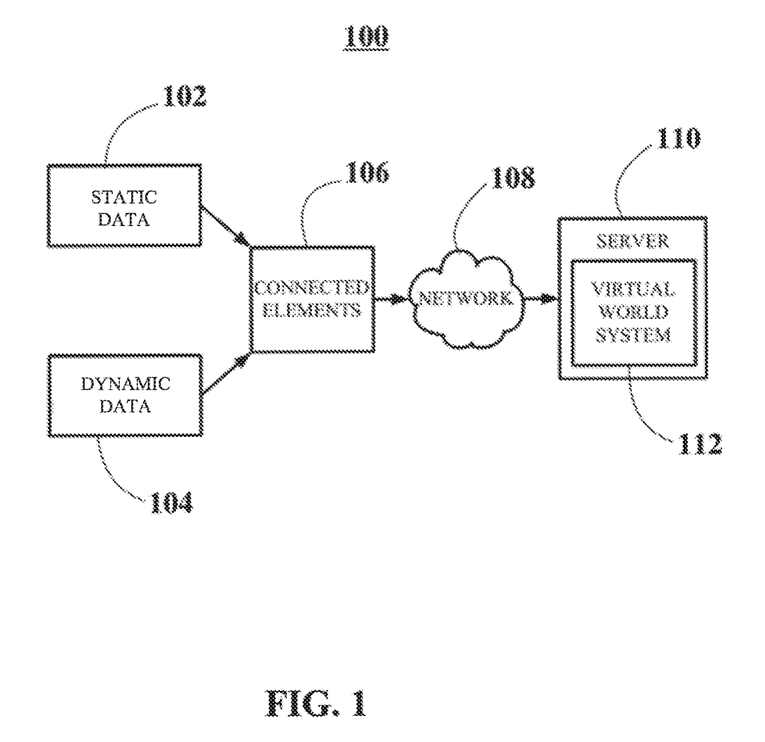
FIG. 1 depicts a schematic representation of a system enabling live management of events in the real world through a persistent virtual world, according to an embodiment.

FIG. 1 depicts a schematic representation of a system 100 enabling live management of events in the real world through a persistent virtual world, according to an embodiment. System 100 includes static data 102 and dynamic data 104, which may be captured from real-world elements by sensing mechanisms implemented on connected elements 106. The connected elements 106 send via a network 108, e.g., in real-time, the static data 102 and dynamic data 104 to a server 110 storing a persistent virtual world system 112. Although references are made herein to a single server, it should be understood that the persistent virtual world system 112 or other features described herein may be implemented in or performed by a server system comprising one or more server computers.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas, purely virtual objects and digital reality applications cease, and independent of users being connected to the virtual world system. Thus, the virtual world system is saved in a non-volatile storage location, e.g., in the server 110. In this way, virtual replicas, purely virtual objects and digital reality applications may interact and collaborate with each other when being configured for accomplishing specific goals even if users are not connected to the server.

In the current disclosure, the term "events" refers to activities taking place in the real world which may be simulated in real-time via the persistent virtual world system. Events may be determined by computer logic under a plurality of criteria that can be defined within value thresholds. Events can be classified into ordinary events and extraordinary events. Ordinary events relate to activities that fall within predetermined standard parameter values, while extraordinary events refer to events that fall out of the predetermined parameter values. For example, an ordinary event can be moving traffic, a payment transaction or playing a sport, while an extraordinary event may refer to a car accident, a potential ID/money theft during a payment transaction, or a foul/accident during a game. Due to the synchronization of real-world elements with their respective virtual replicas, events can be updated in real-time in the persistent virtual world system, which can serve during the management of the events. In some embodiments, events are generated by artificial intelligence algorithms, user-input, or combinations thereof. In other embodiments, events can be further affected by natural occurrences, such as by weather, force majeure events (e.g., earthquakes, lightning, floods, etc.), and the like.

According to an embodiment, the data obtained from connected elements comprises capturable data of each real-world element, comprising one or more of 3D image data, 3D geometries, 3D entities, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, telemetry data (e.g., vehicular telemetry data and device telemetry data) and mass data, amongst others.

In some embodiments, the static data 102 includes data that is not likely to change, such as the location, position and orientation of static objects, such as buildings and internal elements, monuments, parks, natural structures, etc. In other embodiments, the dynamic data 104 includes data that is periodically updated, meaning that it may change asynchronously over time as new information becomes available. For example, dynamic data 104 may include the position and orientation of moving objects, such as vehicles, or other data that may change over time, such as temperature, pressure, humidity, etc.

In some embodiments, the network 108 may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), and wireless fidelity (WiFi), satellite, mobile ad-hoc network (MANET), and the like.

In an embodiment, in order to reduce hardware and network demands, contribute to the reduction of network latency, and improve the general digital reality experience, the system may connect through a network including millimeter-wave (mmW) or combinations of mmW and sub 6 GHz communication systems, such as through $5^{th}$ generation wireless systems communication (5G). In other embodiments, the system may connect through a wireless local area networking (Wi-Fi) providing data at, e.g., 60 GHz. Provided communication systems may allow for low (e.g., about 1 to about 5 milliseconds) end-to-end (E2E) latency and high (e.g., 1-10) Gbps downlink speeds to end points in the field, complying with parameters necessary for executing the typically highly-interactive digital reality applications. This results in high-quality, low latency, real-time digital application content streaming. In other embodiments, the system may communicatively connect through 4th generation wireless systems communication (4G), may be supported by 4G communication systems, or may include other wired or wireless communication systems.

In other embodiments, global navigation satellite systems (GNSS), which refers collectively to multiple satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In a preferred embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

Figure 2:
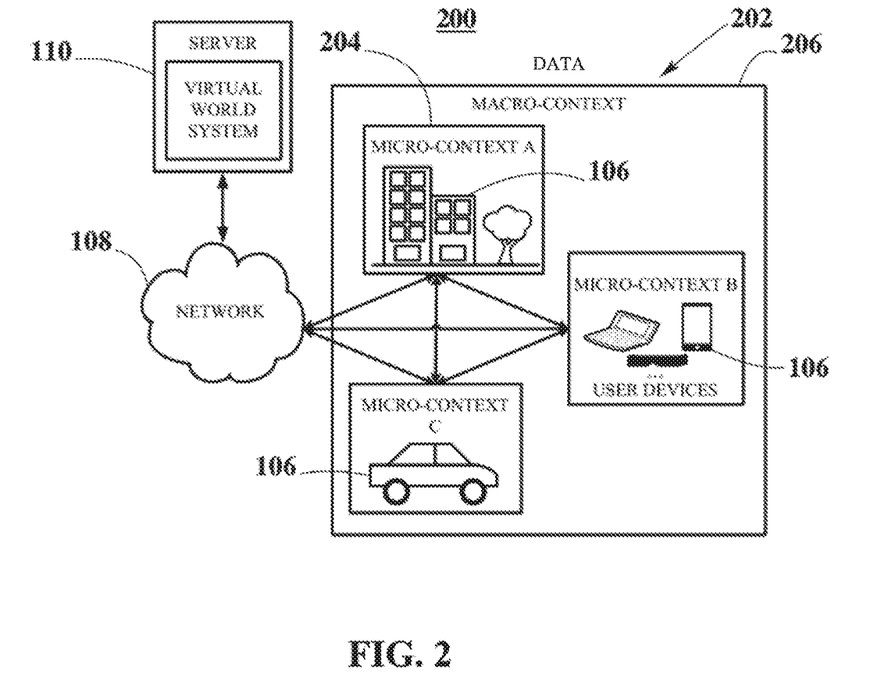
FIG. 2 depicts a schematic representation detailing the capture of data that is used to enrich and synchronize a persistent virtual world system, according to an embodiment.

FIG. 2 depicts a schematic representation of a system 200 detailing the capture of data that is used to enrich and synchronize a persistent virtual world system, according to an embodiment. Some elements of FIG. 2 may be similar to elements of FIG. 1, and thus similar or identical reference numerals may be used to depict those elements.

System 200 includes a server 110 connected via a network 108 to a plurality of connected elements 106 capturing data 202 via various sensing mechanisms. The plurality of sensing mechanisms mounted on the connected elements 106 capture data 202 from themselves and from the context related to each connected element 106, including any real-world element. Accordingly, each real-world element may or may not be a connected element 106. For example, a building may be both a connected element 106 and a real-world element, while a tree may only represent a real-world element but not a connected element 106 because, for example, no devices configured to capture or transmit data 202 may be connected to the tree. The data 202 is transferred (e.g., in real-time) to the persistent virtual world system 112 stored in the server 110.

The plurality of connected elements 106 may include one or more mobile phones, laptops, wearable computers, personal computers, mobile game consoles, head-mounted displays, see-through devices, surveillance cameras, vehicles, traffic lights, buildings and other structures, streets, train-tracks, home appliances, or any other device that may be connected via a network 108. According to an embodiment, the plurality of sensing mechanisms mounted on the connected elements 106 include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof.

Although FIG. 2 shows one server 110, it may be understood that more than one server 110 in one or more locations may be used to serve a complex system comprising a plurality of connected elements 106 located in various locations. Thus, the plurality of connected elements 106 may be connected to the one or more servers 110 depending on the location of the connected elements 106 at a specific point in time. Moreover, the plurality of connected elements 106, as shown in FIG. 2, may be connected to a server 110 and at the same time may also connect to each other via the network 108.

The data 202 includes capturable data of each real-world element, including 3D image data, 3D geometries, 3D entities, 3D dynamic objects, 3d avatars of users, objects and buildings, video data, audio data, priority data, chemical composition, waste production data, textual data, time data, positional data, orientational data, velocity data, temperature data, humidity data, pollution data, lighting data, volume data, flow data, color data, power consumption data, bandwidth data, mass data, or any other data that may be captured by sensing mechanisms. The plurality of sensing mechanisms captures, apart from data corresponding directly to each real-world element, contextual data from the surrounding environment, which may be classified as micro-context 204 and macro-context 206.

The term "real-world element", as used in the current disclosure, refers to elements found in the real world having physical properties which may be sensed by sensing mechanisms. The real-world elements may be moving or static entities found in the real world, including human beings, vehicles, buildings, objects, recreation areas, natural formations, streets, and any other element that may be found in the real world. Real-world element data captured by sensing mechanisms of connected elements 106 may be extracted from 3D image data, 3D geometries, video data, audio data, temperature data, mass data, radiation data, haptic data, motion data, or any other capturable data that may be obtained by sensing mechanisms. As such, the real-world elements themselves may include sensing mechanisms and may themselves capture data 202. Thus, to the perception of other connected elements 106, other connected elements 106 may also be categorized as real-world elements.

The term "context" or "contextual data", as used in the current disclosure, refers to data related to the direct or indirect environment of a specific real-world element, which may be classified as "micro-context" and "macro-context".

The term "micro-context" refers to the context immediately surrounding a real-world element, such as people, objects, or conditions that may directly affect the real-world element. Micro-context 204 may include data such as 3D image data, 3D geometries, 3D entities, 3D dynamic objects, video data, audio data, textual data, time data, metadata, priority data, security data, positional data, lighting data, temperature data, and quality of service (QOS), amongst others, of the environment immediately surrounding and affecting a target real-world element. In an embodiment, the micro-context 204 also includes service context, which refers to the actual applications used being used by a user or users in the vicinity. As each application consumes bandwidth, service context may provide the system 200 with valuable context information required to assess provisioning of network signals to each connected elements 106.

The term "macro-context" refers to the indirect or more distant context surrounding a real-world element. The macro context may be derived by the server 110 from a plurality of micro-context 204, giving rise to more holistic information of a system, such as the current efficiency of a manufacturing plant, air quality, climate change levels, company efficiency, city efficiency, country efficiency, etc. The macro context may be considered and computed at different levels including local level (e.g., office or manufacturing plant), neighborhood level, city level, country level, or even planet level. Thus, the same real-world element data and micro context data may derive different types of macro-contexts 206.

Figure 3:
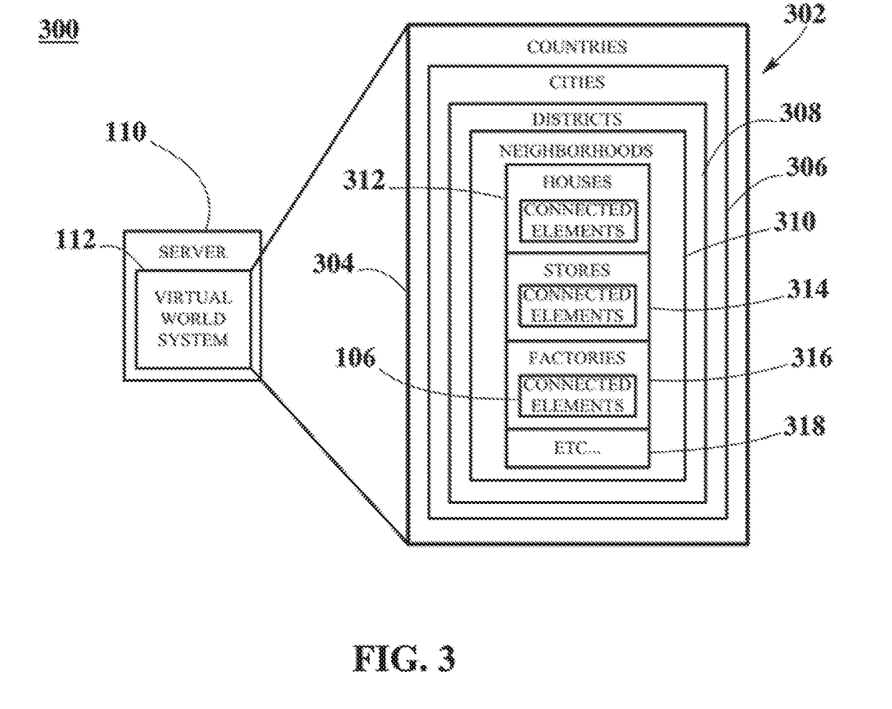
FIG. 3 depicts a schematic representation of layers of a persistent virtual world system, according to an embodiment.

FIG. 3 depicts a schematic representation of layers of a persistent virtual world system 112, according to an embodiment. Some elements of FIG. 3 may be similar to elements of FIGS. 1-2, and thus similar or identical reference numerals may be used to depict those elements.

In some embodiments, the persistent virtual world system 112 stored in the server 110 is structured by layers 302, wherein outer layers define broad geographical areas and inner layers define smaller geographical areas within the outer layers, and wherein event management is implemented by layers. The outer layers may represent higher-level entities, and the inner layers may represent lower-level entities. For example, an outer layer may represent a country 304, which may be comprised of several cities 306, each city 306 representing an inner layer of the country 304. Each city 306, on the other hand, may include several districts 308, each district 308 representing an inner layer of the city 306. The districts may include several neighborhoods 310, each neighborhood 310 representing an inner layer of the district 308. Each neighborhood may include several houses 312, stores 314, factories 316, and others 318, each of these elements representing an inner layer of the neighborhood 310. Finally, each of these inner layer elements of the neighborhood 310 may also include connected elements 106 with sensing mechanisms configured to obtain real-time data that enriches and updates the virtual replicas of the persistent virtual world system 112.

Figure 4:
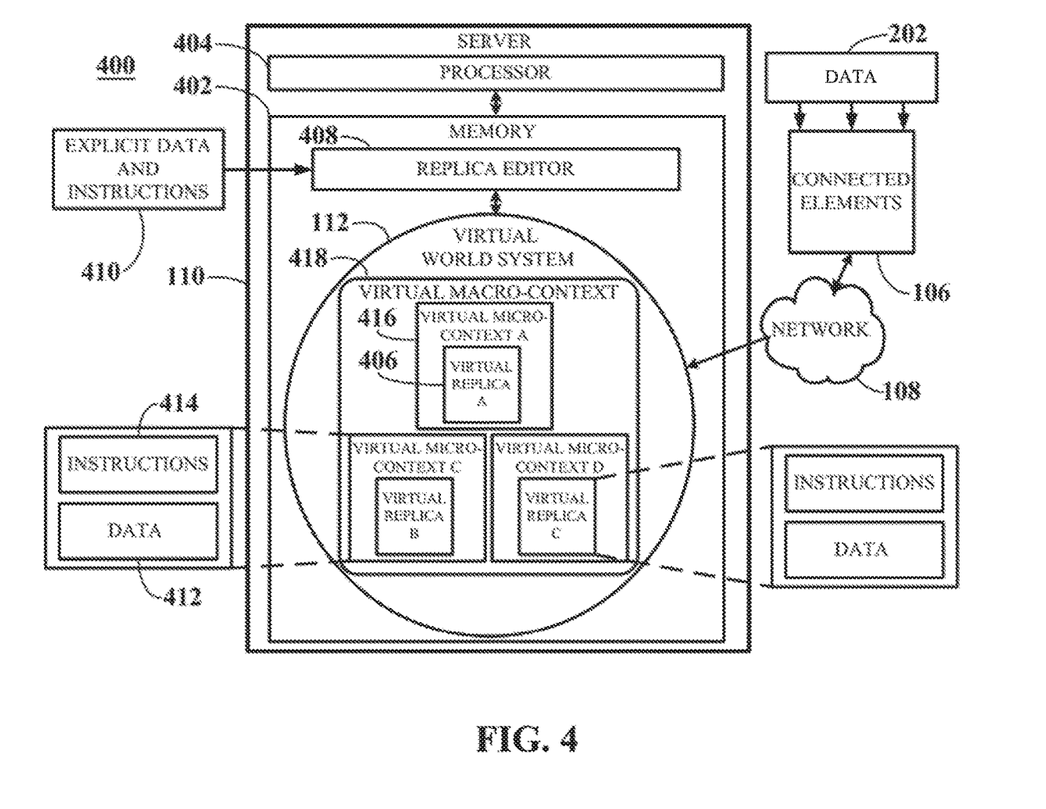
FIG. 4 depicts a schematic representation of a system detailing the relation of a server with connected elements of the real world.

FIG. 4 depicts a schematic representation of a system 400 detailing the relation of a server with connected elements of the real world. Some elements of FIG. 4 may be similar to elements of FIGS. 1-3, and thus similar or identical reference numerals may be used to depict those elements.

A system 400 of the current disclosure includes at least one server 110 and a plurality of connected elements 106 connected to the at least one server 110 via a network 108. The server 110 includes a memory 402 and at least one processor 404. The memory 402 stores a database with structured data storing persistent virtual world system 112 comprising a plurality of virtual replicas 406, such as virtual replicas 406 A, B, and C, corresponding to respective real-world elements. The virtual replicas 406 communicatively connect to the real-world elements through sensing mechanisms attached to a plurality of devices connected to the server 110 via a network 108. The sensing mechanisms provide the virtual replicas 406 with data 202 enabling real-world and persistent virtual world system 112 synchronization. The at least one processor 404 is configured to enable live management of events in the real world through the synchronized persistent virtual world system 112.

Some of the virtual replicas 406, namely the virtual replicas 406 of real world elements that do not include any sensing mechanisms (i.e., natural formations, vehicles that cannot connect to a network, buildings that are not connected to a network, new elements that are not yet connected to the at least one server 110, etc.), may only appear graphically in the persistent virtual world system 112 and may only be updated visually through optical sensors, such as cameras or scanners, attached to other connected elements 106.

In some embodiments, a virtual replica includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, the persistent virtual world system 112 comprises a virtual 3D infrastructure including one or more virtual replicas 406, purely virtual objects, virtual corridors, and digital reality applications, or combinations thereof enabling spatial organization, behaviors, computational and logical interactions between each other and with elements of the real world through their corresponding virtual replicas. The virtual corridors of the virtual 3D infrastructure can serve to define and delimit the path of real objects through their virtual replicas, purely virtual objects, or digital reality applications. For example, a virtual corridor can be used for delimiting the flight-path of a drone or airplane by servicing the flight-path as a virtual corridor, which can be accessed and processed through the respective virtual replicas.

The at least one server 110 may provide computing resources sufficient to carry out heavy load applications, such as servicing, distributing, computing, streaming, and/or rendering digital content from one or more digital reality applications for interaction with users. In preferred embodiments, the computing environment of the servers 110 is run on an abstracted, virtualized infrastructure that shares resources such as CPU, memory and storage between applications, such as in cloud servers. Using a cloud computing network, access to computing power, computer infrastructure (e.g., through so-called infrastructure as a service, or IaaS), applications, and business processes can be delivered as a service to users on demand.

According to an embodiment, the memory 402 further includes a replica editor 408 which may include software and hardware configured to enable users to model and edit the virtual replicas 406 of the real world entities. The replica editor 408 may be, for example, computer-aided drawing (CAD) software that may store data and instructions necessary to input and edit virtual replicas 406. The replica editor 408 may enable the input of explicit data and instructions 410 that relate to each digital replica, which refers to data and instructions that describe the shape, location, position and orientation, or other properties, and the expected functioning and impact of each virtual replica 406 and the persistent virtual world system 112 as a whole.

"Explicit data" refers herein to data that may not be obtained by the sensing mechanisms but which may instead need to be input digitally through the replica editor 408, such as priority data, building materials, wall thicknesses, electric installations and circuitry, water pipes, fire extinguishers, emergency exits, window locations, machine performance parameters, machine sensor and valve locations, etc. "Priority data", as used herein, refers to a hierarchical classification of real world entities. For example, certain vehicles (e.g., ambulances) or people (e.g., presidents, government officials, police officers, etc.) may have higher priorities which may affect the decisions performed based on data inference. The term "instructions", as used herein, refers to code (e.g., binary code) that is configured to be executed by a processor. In the context of a virtual replica 406, instructions may refer to code that represents the behavior of the real-world element.

Modeling techniques for converting real world entities into virtual replicas 406 with explicit data and instructions 410 and make them available in the persistent virtual world system 112 may be based on readily-available CAD models of the real world entities. For example, machine owners may provide an administrator of the persistent virtual world system 112 or may input by themselves the already-existing digital CAD models of their machines. Similarly, building owners may provide building information models (BIM) with building details to be stored in the persistent virtual world system 112, which may include information that may not be visible or easily obtainable via sensing mechanism. In these embodiments, the owners of these real world entities may be responsible for adding the virtual replicas into the persistent virtual world system 112, which may be achieved, for example, through incentive systems or by legal requirements. In some embodiments, the administrators of the persistent virtual world system 112, and even government officials, may collaborate with owners of real world entities for inputting the real world entities into the persistent virtual world system 112 and therefore realizing a faster and more thorough creation of the persistent virtual world system 112.

In other embodiments, radar-imaging, such as synthetic-aperture radars, real-aperture radars, Light Detection and Ranging (LIDAR), inverse aperture radars, monopulse radars, and other types of imaging techniques may be used to map and model real world entities before integrating them into the persistent virtual world system 112. Utilizing these more technical solutions may be performed especially in cases where the original models of the structures are not available, or in cases where there is missing information or there is a need to add additional information to the virtual world entities which is not provided by the CAD models.

Independent of the modeling techniques used for creating the virtual replicas 406, the information of each virtual replica 406 should provide enough details about each corresponding real-world element so that a highly accurate virtual replica 406 of each real-world element is available. The virtual replicas 406 are then enriched and updated through the data 202. Thus, virtual replicas 406 include data 412 and instructions 414 that serve to describe the real appearance and behavior of each real-world element, unless referring to virtual replicas 406 of unconnected elements that may only provide their respective real appearance and no data and instructions regarding their functionality.

As described with respect to FIG. 2, the data 202 may also include contextual data, such as micro-context 204 including micro-context A, B, and C, and macro-context 206. This same data is then transferred to the persistent virtual world system 112 to become, respectively, a virtual micro-context 416 including virtual micro-context A, B, and C, and a virtual macro-context 418, which are updated in real-time based on the data 202 obtained by sensing mechanisms of the connected elements 106. The virtual micro-context 416 and virtual macro-context 418 also include data 412 and instructions 414 that serve to describe the respective real-world appearance and behavior.

Figure 5:
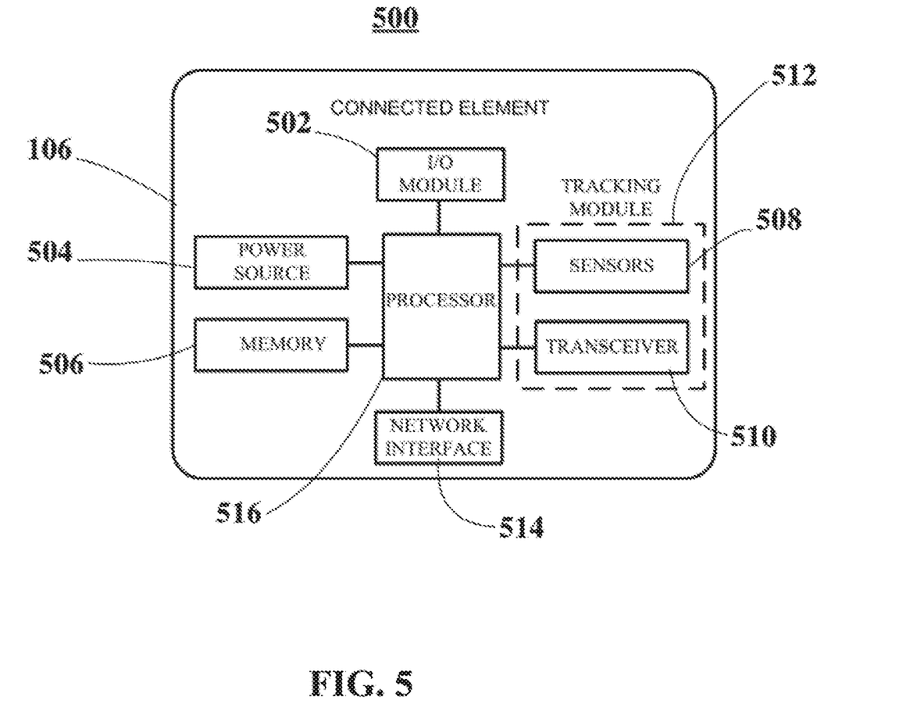
FIG. 5 depicts a schematic representation of a connected element, according to an embodiment.

FIG. 5 depicts a schematic representation of a system 500 depicts a schematic representation of a connected element, according to an embodiment. Some elements of FIG. 5 may be similar to elements of FIGS. 1-4, and thus similar or identical reference numerals may be used to depict those elements.

A connected element 106 may include operational components such as an input/output (I/O) module 502; a power source 504; a memory 506; sensing mechanisms 508 and transceivers 510 forming a tracking module 512; and communication circuitry such as a network interface 514, all operatively connected to a processor 516.

The I/O module 502 is implemented as computing hardware and software configured to interact with users and provide user input data to one or more other system components. For example, I/O module 502 may be configured to interact with users, generate user input data based on the interaction, and provide the user input data to the processor 516 before being transferred to other processing systems via a network, such as to a server. In another example, I/O modules 502 is implemented as an external computing pointing device (e.g., a touch screen, mouse, 3D control, joystick, gamepad, and the like) and/or text entry device (e.g., a keyboard, dictation tool, and the like) configured to interact with other connected elements 106. In yet other embodiments, I/O module 502 may provide additional, fewer, or different functionality to that described above.

The power source 504 is implemented as computing hardware and software configured to provide power to the connected elements 106. In one embodiment, the power source 504 may be a battery. The power source 504 may be built into the devices or removable from the devices, and may be rechargeable or non-rechargeable. In one embodiment, the devices may be repowered by replacing one power source 504 with another power source 504. In another embodiment, the power source 504 may be recharged by a cable attached to a charging source, such as a universal serial bus ("USB") FireWire, Ethernet, Thunderbolt, or headphone cable, attached to a personal computer. In yet another embodiment, the power source 504 may be recharged by inductive charging, wherein an electromagnetic field is used to transfer energy from an inductive charger to the power source 504 when the two are brought in close proximity, but need not be plugged into one another via a cable. In another embodiment, a docking station may be used to facilitate charging.

The memory 506 may be implemented as computing hardware and software adapted to store application program instructions and to store data captured by the plurality of sensing mechanisms. The memory 506 may be of any suitable type capable of storing information accessible by the processor 516, including a computer-readable medium, or other medium that stores data that may be read with the aid of an electronic device, such as a hard-drive, memory card, flash drive, ROM, RAM, DVD or other optical disks, as well as other write-capable and read-only memories. The memory 506 may include temporary storage in addition to persistent storage.

The sensing mechanisms may be implemented as computing hardware and software adapted to obtain various data from the real world and determine/track the position and orientation of the connected elements 106. The sensing mechanisms may include, without limitations, one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms include one or more Inertia Measuring Units (IMUs), accelerometers, and gyroscopes. The IMU is configured to measure and report the velocity, acceleration, angular momentum, speed of translation, speed of rotation, and other telemetry metadata of connected elements 106 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 510 may be implemented as computing hardware and software configured to enable devices to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 510 may be a two-way communication transceiver 510.

According to an embodiment, the transceivers 510 enable direct communication between computing devices via a distributed ledger-based communications pipeline connected to a network. The distributed ledger-based communications pipeline may enable direct communication between connected elements 106 through a decentralized network by allowing storage of information in a secure and accurate manner using cryptography, employing cryptographic "keys" and cryptographic signatures. Situations that may require direct communication between connected elements 106, and thus by-passing processing by a server, may include urgent situations in which decisions may need to be taken within a very short period of time. For example, in an autonomous driving case where two vehicles may be about to collide, it may be desired to enable a direct communication between both vehicles to generate a faster response that may prevent a collision. In other embodiments, the distributed ledger may also be utilized between server a connected elements 106, where the server may take the authority to validate data before distributing it to each connected elements 106. In further embodiments, the distributed ledger can make use of certain connected elements 106 closer to servers, to antennas, or both, in order to assign these connected elements 106 as central structures to validate and distribute data.

In an embodiment, the tracking module 512 may be implemented by combining the capabilities of the IMU, accelerometers, and gyroscopes with the positional tracking provided by the transceivers 510 and the accurate tracking, low-latency and high QOS functionalities provided by mmW-based antennas may enable sub-centimeter or sub-millimeter positional and orientational tracking, which may increase accuracy when tracking the real-time position and orientation of connected elements 106. In alternative embodiments, the sensing mechanisms and transceivers 510 may be coupled together in a single tracking module device.

The network interface 514 may be implemented as computing software and hardware to communicatively connect to a network, receive computer readable program instructions from the network sent by the server or by other connected elements 106, and forward the computer readable program instructions for storage in the memory 506 for execution by the processor 516.

The processor 516 may be implemented as computing hardware and software configured to receive and process data. For example, the processor 516 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 516 may receive user input data from I/O module 502 and may respectively implement application programs stored in the memory 506. In other examples, the processor 516 may receive data from sensing mechanisms captured from the real world, or may receive an accurate position and orientation of connected elements 106 through the tracking module 512, and may prepare some of the data before sending the data to a server for further processing. As way of example, the processor 516 may realize some of the steps required during data preparation including analog or digital signal processing algorithms such as raw data reduction or filtering of data before sending the data to a server.

Figure 6:
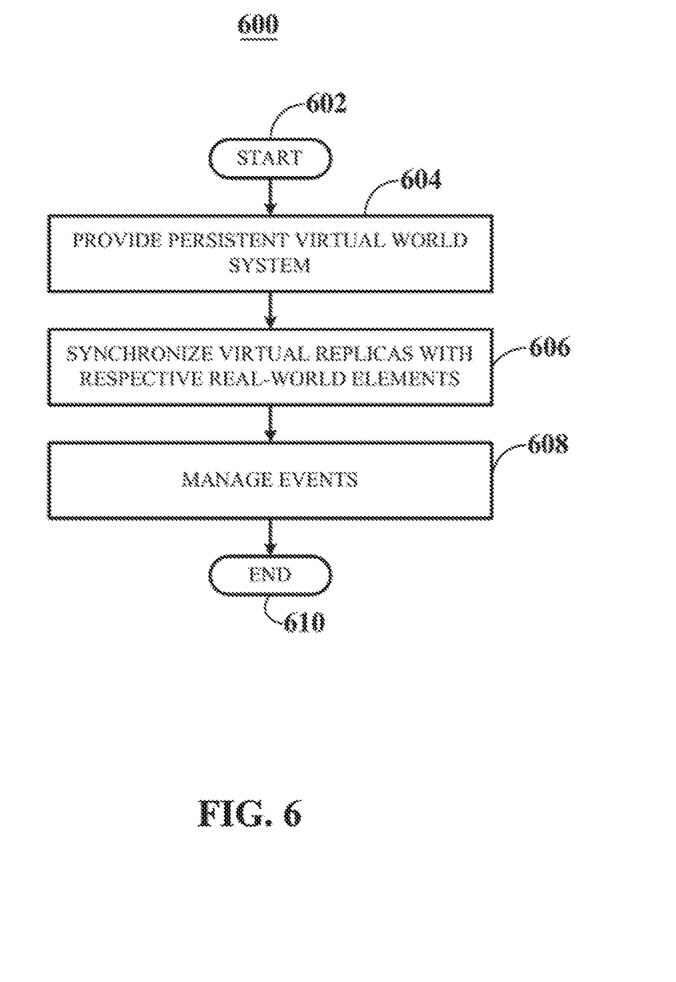
FIG. 6 depicts a block diagram of a method enabling live management of events in the real world through a persistent virtual world, according to an embodiment.

FIG. 6 depicts a block diagram of a method 600 enabling live management of events in the real world through a persistent virtual world, according to an embodiment. Method 600 may be implemented by a system, such as systems shown with respect to FIGS. 1-5.

The method 600 starts in blocks 602 and 604 by providing in the memory of a server a database with structured data storing a persistent virtual world system comprising virtual replicas of real-world elements. The method 600 continues in step 606 by synchronizing the virtual replicas with the respective real-world elements by using a plurality of connected elements connected to the server via a network, the connected elements comprising sensing mechanisms configured to capture data from the real-world elements. The method continues in step 608 by managing events in the real world through the synchronized persistent virtual world system, ending the process in step 610.

Figure 7:
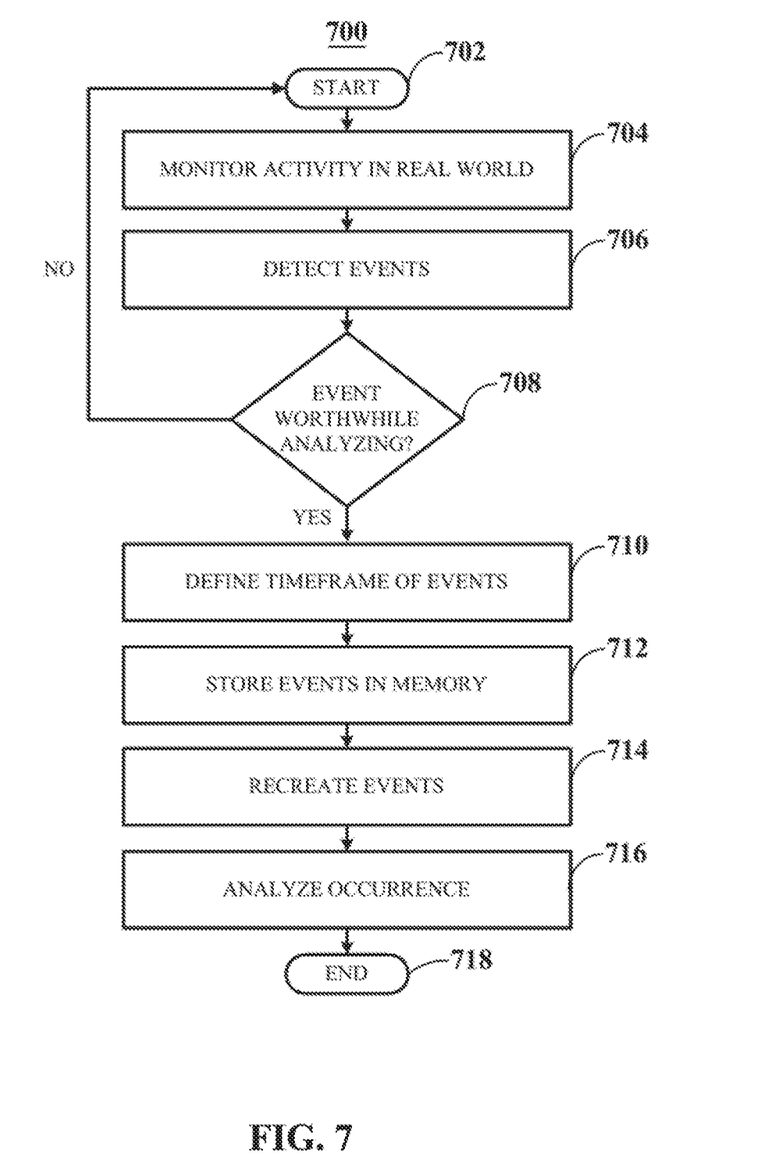
FIG. 7 depicts a block diagram detailing further steps of the method enabling management of events in the real world through a persistent virtual world system, according to an embodiment.

FIG. 7 depicts a block diagram of a method 700 detailing further steps of the method 600 enabling management of events in the real world through a persistent virtual world system, according to an embodiment, as described in FIG. 6. Method 700 may be implemented by a system, such as systems shown with respect to FIGS. 1-5.

Management of events in the real world begins in steps 702 and 704 by monitoring activity in the real world through the persistent virtual world system. Monitoring of events may be performed through a plurality of sensing mechanisms on a plurality of connected elements connected to at least one server via a network (e.g., connected elements 106 of FIG. 1 connected to the at least one server 110 via the network 108), and may comprise a passive observation of all activity taking place in the real world. For example, monitoring of events may refer to the behavior of traffic in a specific highway. The monitoring may be performed, for example, by a combination of cameras installed in various areas of the highway, speed sensors on the sides of the highway, motion sensors, and by geo-positional and orientational tracking of each of the vehicles.

Method 700 may continue in block 706 by detecting the events, wherein the events are defined within pre-determined parameter values that are compared with the real values of activities in the real world. In yet another embodiment, detecting events further comprises classifying the events into ordinary or extraordinary events. For example, the real values may refer to the real speed of each of the cars in a highway or the average speed of all the traffic in the highway, and the predetermined standard value ranges may refer to the expected speed range of each vehicle within the highway or the expected average speed range of the traffic. If the compared real values fall within the predetermined standard value ranges, then the events may be classified as ordinary events. On the other hand, if the compared real values fall outside of the predetermined standard value ranges, the events may be classified as extraordinary events, such as when a vehicle is going at an extremely high speed, or when there has been a car accident.

Method 700 continues in step 708 by checking whether events fall within one or more predetermined analysis requirement parameters. Checking whether events fall within one or more predetermined analysis requirement parameters refers to comparing the detected event's real values with a range of predetermined analysis requirement parameter values defined to trigger analysis of the events. Determining that an event is worthwhile analyzing depends, in some embodiments, on risk factors that may be linked to the event, such as risk to safety or integrity of others, risk of contamination, risk of material damage risk, etc. Thus, events that are worthwhile analyzing may be linked to critical control points related to the one or more activities that are monitored. Examples of events that may be worthwhile analyzing may, for example, a financial card payment, a machine operation for a critical process, or behavior of one or more vehicles in a congested highway; behaviors of air, water or land vehicles; factory operations; and entertainment activities, such as video games, film-making, sports activities, TV, theater or musical performances, etc.

If the method 700 determines that the event is not worthwhile analyzing, the method 700 may loop back to step 704 by continuing to monitor the real world. If the method 700 determines that the event is worthwhile analyzing, the method 700 continues in step 710 by defining the timeframe of the events, so that the initial and ending time of the event are identified, for further storage of the event in the memory of the at least one server, as viewed in step 712.

In step 714 the method 700 continues by recreating the events. Recreating the events may be performed by generating event data points comprising data gathered within the duration of analysis-worthwhile events. In some embodiments, recreating the events further comprises generating simulation data corresponding to duration of the events. In some embodiments, recreating of events further comprises replaying events and experiences related to the events in digital realities (e.g., augmented reality, or virtual reality, or combinations thereof).

In step 716, the method may continue by analyzing the events, which may be performed by applying statistical and/or logical algorithms to describe, condense and evaluate the events. Analysis of events may also be performed automatically by artificial intelligence algorithms or may involve human interaction. The method 700 may end in step 718.

According to an embodiment, recreating events in digital realities may provide event analyzers with context-rich 3D images and experiences of the events, which may be helpful during event analysis. In some embodiments, the events may be reviewed and analyzed from different perspectives. For example, a car accident event may be reviewed and analyzed in virtual reality from the perspective of any of the two or more involved vehicles for a judicial investigation in order to determine the responsibility level of each involved party. In other embodiments, recreating events may also provide other types of experiences created during generation of event data points, including simulations with audio data, haptic data, motion data, connected element or system data (like vehicular telemetry, drone telemetry) textual data (e.g., subtitles, comments, annotations, etc.), etc.

According to an embodiment, management of events further comprises operation of the events through artificial intelligence algorithms or user input. Operation of events may be performed as a result of the analysis of the events. Operation of events may trigger one or more actions on one or more real-world elements through their respective virtual replicas in the persistent virtual world system. In some embodiments, operations of events may be influenced by whether the events are ordinary or extraordinary events. Preferably, for high-risk events, analysis is performed automatically by artificial intelligence algorithms, which can determine at relatively high speeds the types of operations that may be required to rectify the events or lower the risks of the events. For example, in the case of a car accident, artificial intelligence algorithms may determine that all cars in surrounding areas to the accident should slow down or come to a halt to prevent further damages.

According to an embodiment, management of events further comprises sharing the stored events with other users through one or more other servers. Sharing of events may be performed in order to perform further analysis of the events, further operations, or combinations thereof.

According to an embodiment, occurrence of events has an effect on the context around the events, triggering other events in the real world through the persistent virtual world system that comprise interactions between one or more real-world elements within the affected context. Such effects on the context of events may trigger further operations of real-world elements, which can provide further data for analysis of the events.

According to an embodiment, generating event data points within the duration of the event refers to identifying data corresponding to the occurrence. In further embodiments, the event data points further include contextual information. For example, during a car accident, the corresponding data points may refer to the actual footage that may translate into a media stream to be replayed to an occurrence analyzer for subsequent analysis. The data points may further include information about the speed at which the vehicles were traveling, the position and orientation, and route. In addition, in the current example, the contextual information that may be included in the data points may include the weather conditions at which the accident happened, the situation of traffic lights, other vehicles in the area, pedestrians or animals walking, or any other factors that may have an effect on the accident. The event data points may further include other data points that may be helpful during an event analysis, such as audio data, haptic data, motion data, textual data, etc. All of these data points may be used to provide a context-rich replay of the occurrence, which may be later analyzed by an occurrence analyzer.

In some embodiments, the event may be replayed as a digital reality experience to a user, where digital realities include one or more of augmented reality, virtual reality, mixed reality, or combinations thereof. Accordingly, an event analyzer, in order to review an event, may be able to view, via user devices, a context-rich 3D replay of the event in a digital reality, which may provide the event analyzer with further information that may help during the analysis. The event may be reviewed from different perspectives, such as the perspective of any of the two or more involved vehicles. For example, it is usually very time-consuming to investigate the cause of a car accident. Police have to analyze footage from different angles, obtain numerous testimonies from witnesses, etc. However, being able to view and experience the event in a digital reality, such as virtual reality, may help in speeding-up the efficiency of the investigation. In other embodiments, the replay of the events may also provide other types of experiences, including simulations with audio data, haptic data, motion data, textual data (e.g., subtitles, comments, annotations, etc.), etc. The further experiences may be generated during the creation of event data points.

In some embodiments, management may be implemented by layers, such as the layers 302 described with reference to FIG. 3. For example, a human or artificial intelligence administrator at a district level may be responsible for monitoring a district, and may be in charge of analyzing events therein. In other examples, a human or artificial intelligence administrator at a city level may be responsible for monitoring a city, and may be in charge of analyzing events therein.

While certain embodiments have been described and shown in the accompanying drawings, it is to be understood that such embodiments are merely illustrative of and not restrictive, and that the invention is not limited to the specific constructions and arrangements shown and described, since various other modifications may occur to those of ordinary skill in the art. The description is thus to be regarded as illustrative instead of limiting.

The invention claimed is:

1. A system comprising:
a server system comprising one or more server computers, each server computer comprising memory and at least one processor, the server system including a database with structured data storing a persistent virtual world system comprising virtual replicas of real-world elements; and
a plurality of connected elements connected to the server via a network, each connected element comprising communication circuitry and one or more sensing mechanisms configured to capture data from one or more of the real-world elements,
wherein the server system is configured to synchronize the persistent virtual world system with the real-world elements using dynamic data captured by the connected elements and static data, and to enable live management of events in the real world through the synchronized persistent virtual world system.

2. The system of claim 1, wherein the management of the events comprises one or more of the following:
monitoring activity in the real world through the persistent virtual world system;
detecting the events, wherein the events are defined within pre-determined parameter values that are compared with real values of activities in the real world;
checking whether the events fall within one or more predetermined analysis requirement parameters, wherein the checking step comprises, in a negative case where an event falls outside the one or more predetermined analysis requirement parameters, continuing to monitor activity in the real world, and in a positive case where the event falls within the one or more predetermined analysis requirement parameters, the process continues by:
defining a timeframe of the event;
storing the event in the memory;
recreating the event; and
analyzing the event.

3. The system of claim 2, wherein detecting the events further comprises classifying the events into ordinary or extraordinary events.

4. The system of claim 2, wherein recreating the event comprises generating event data points comprising data gathered within the duration of the event, or generating simulation data corresponding to duration of the event, or combinations thereof.

5. The system of claim 1, wherein the management of the events comprises operation of the events through artificial intelligence algorithms or user input, and wherein said operation of the events triggers one or more actions on the one or more real-world elements through the respective virtual replicas in the persistent virtual world system.

6. The system of claim 1, wherein the management of the events comprises sharing stored events with one or more users.

7. The system of claim 1, wherein the events have an effect on context around the events, triggering other events in the real world through the persistent virtual world system that comprise interactions between one or more real-world elements within the affected context.

8. The system of claim 1, wherein the events are generated by artificial intelligence algorithms, user input, or combinations thereof, and wherein the events can be further influenced by natural occurrences.

9. The system of claim 1, wherein the persistent virtual world system is structured by layers comprising outer and inner layers, wherein outer layers define broad geographical areas and inner layers define smaller geographical areas within the outer layers, and wherein the management of the events is implemented by said layers.

10. The system of claim 1, wherein the events relate to data generated during financial transactions; air, water, or land vehicles behavior; machine or factory operations; or entertainment activities; or a combination thereof.

11. A method comprising:
providing in memory of a server system a database with structured data storing a persistent virtual world system comprising virtual replicas of real-world elements;
synchronizing the virtual replicas with the respective real-world elements using dynamic data and static data from a plurality of connected elements connected to the server system via a network, the connected elements comprising sensing mechanisms configured to capture the dynamic data from the real-world elements; and
managing events in the real world through the synchronized persistent virtual world system.

12. The method of claim 11, wherein managing the events in the real world comprises one or more of the following:
monitoring activity in the real world through the persistent virtual world system;
detecting the events, wherein the events are defined within pre-determined parameter values that are compared with the real values of activities in the real world;
checking whether the events fall within one or more predetermined analysis requirement parameters, wherein the checking step comprises, in a negative case where an event falls outside the one or more predetermined analysis requirement parameters, continuing to monitor activity in the real world, and in a positive case where the event falls within the one or more predetermined analysis requirement parameters, the process continues by:
defining a timeframe of the event;
storing the event in the memory;
recreating the event; and
analyzing the event.

13. The method of claim 12, wherein detecting the events further comprises classifying the events into ordinary or extraordinary events.

14. The method of claim 12, wherein recreating the event comprises generating event data points comprising data gathered within the duration of the event, or generating simulation data corresponding to duration of the event, or combinations thereof.

15. The method of claim 11, wherein the management of the events comprises operation of the events through artificial intelligence algorithms or user input, and wherein said operation of the events trigger one or more actions on the one or more real-world elements through the respective virtual replicas in the persistent virtual world system.

16. The method of claim 11, wherein the management of the events comprises sharing stored events with one or more users.

17. The method of claim 11, wherein the events have an effect on context around the events, triggering other events in the real world through the persistent virtual world system that comprise interactions between one or more real-world elements within the affected context.

18. The method of claim 11, wherein the events are generated by artificial intelligence algorithms, user-input, or combinations thereof, and wherein the events can be further affected by natural occurrences.

19. The method of claim 11, wherein the persistent virtual world system is structured by layers comprising outer and inner layers, wherein outer layers define broad geographical areas and inner layers define smaller geographical areas within the outer layers, and wherein the management of the events is implemented by the layers.

20. A non-transitory computer readable medium storing a program configured to cause one or more processors to perform steps comprising:
providing a database with structured data storing a persistent virtual world system comprising virtual replicas of real-world elements;
synchronizing the virtual replicas with the respective real-world elements using dynamic and static data obtained from a plurality of connected elements connected to a server via a network, the connected elements comprising sensing mechanisms configured to capture the dynamic data from the real-world elements; and
managing events in the real world through the synchronized persistent virtual world system.

* * * * *